United States Patent [19]

Tsiang

[11] 4,439,829
[45] Mar. 27, 1984

[54] DATA PROCESSING MACHINE WITH IMPROVED CACHE MEMORY MANAGEMENT

[75] Inventor: Horace H. Tsiang, North Andover, Mass.

[73] Assignee: Wang Laboratories, Inc., Lowell, Mass.

[21] Appl. No.: 542,556

[22] Filed: Oct. 17, 1983

Related U.S. Application Data

[63] Continuation of Ser. No. 223,154, Jan. 7, 1981, abandoned.

[51] Int. Cl.³ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,588,829 | 6/1971 | Boland et al. | 364/200 |
| 4,167,782 | 9/1979 | Joyce et al. | 364/200 |
| 4,195,342 | 3/1980 | Joyce et al. | 364/200 |
| 4,208,716 | 6/1980 | Porter et al. | 364/200 |
| 4,245,304 | 1/1981 | Porter et al. | 364/200 |

*Primary Examiner*—Joseph F. Ruggiero
*Assistant Examiner*—Mark P. Watson
*Attorney, Agent, or Firm*—Michael H. Shanahan; Gary D. Clapp

[57] ABSTRACT

A data processing machine in which the cache operating cycle is divided into two subcycles dedicated to mutually exclusive operations. The first subcycle is dedicated to receiving a central processor memory read request, with its address. The second subcycle is dedicated to every other kind of cache operation, in particular either (a) receiving an address from a peripheral processor for checking the cache contents after a peripheral processor write to main memory, or (b) writing anything to the cache, including an invalid bit after a cache check match condition, or data after either a cache miss or a central processor write to main memory. The central processor can continue uninterruptedly to read the cache on successive central processor microinstruction cycles, regardless of the fact that the cache contents are being "simultaneously" checked, invalidated or updated after central processor writes. After a cache miss, although the central processor must be stopped to permit updating, it can resume operations a cycle earlier than is possible without the divided cache cycle.

6 Claims, 23 Drawing Figures

1 BYTE = 8 BITS

|← 1 WORD →|      1 WORD = 4 BYTES = 32 BITS

| 32 BITS | 32 BITS |
|←—— ODD WORD ——→|←—— EVEN WORD ——→|
|←————————— 1 DOUBLE WORD —————————→|

0
0 1
|← 12-BIT PAGE FRAME NUMBER →|← 11-BIT OFFSET →|

SELECT EVEN/ODD

|← 9-BIT TAG →|← 12-BIT INDEX →|

SELECTS A BYTE (IGNORE FOR WORD)

| TAG | | TAG | |
|     |←32 BITS→| |←32 BITS→|
|     |(WORD)   | |(WORD)   |

EVEN            ODD

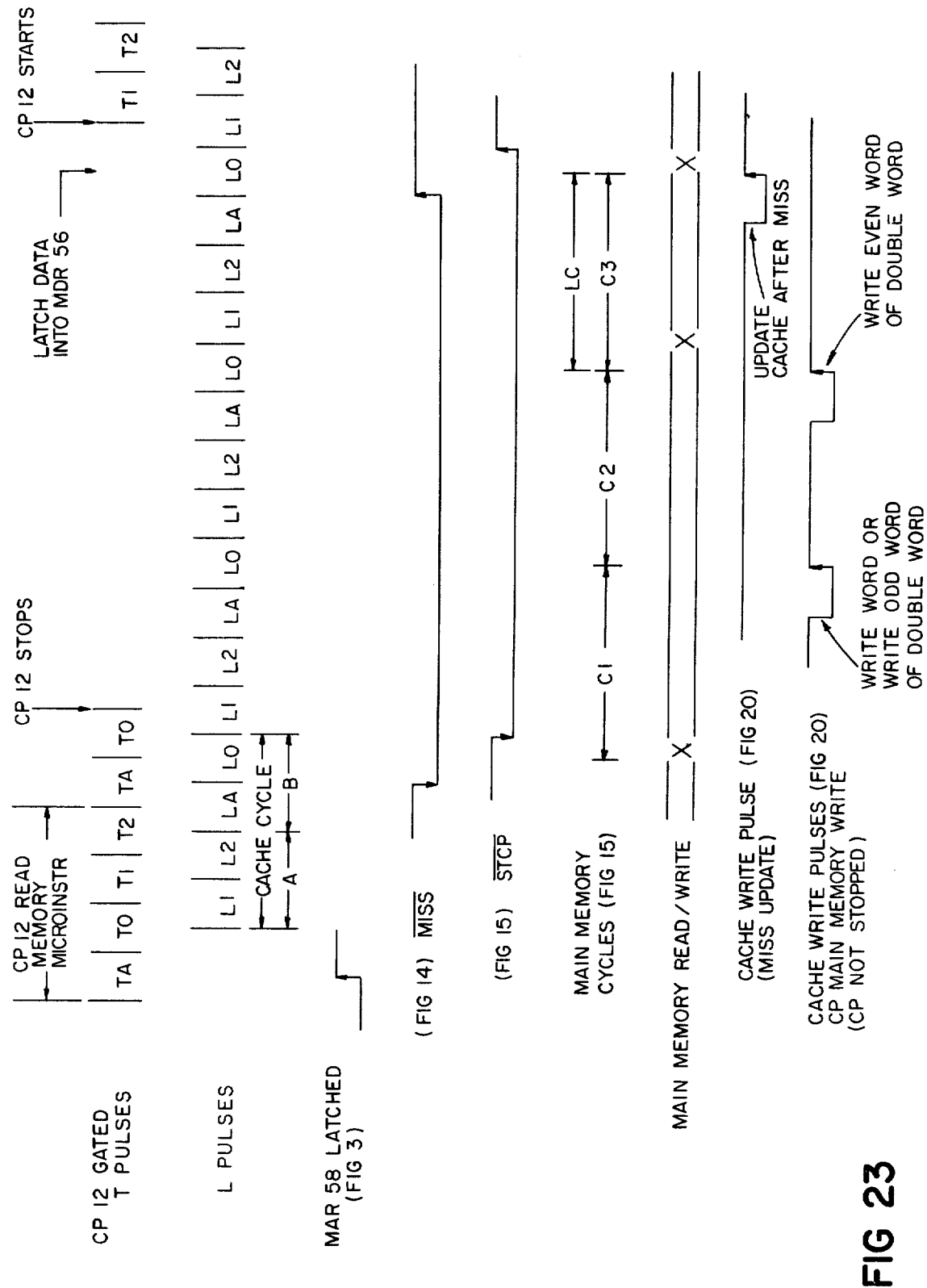

DATA PROCESSING MACHINE WITH IMPROVED CACHE MEMORY MANAGEMENT

The present is a continuation of U.S. patent application Ser. No. 233, 154 filed Jan. 7, 1981 by Horace H. Tsiang for a DATA PROCESSING MACHINE WITH IMPROVED CACHE MEMORY MANAGEMENT, subsequently abandoned.

This invention relates to improvements in memory access management in the operation of data processing machines that employ a cache.

The data processing machine of the present invention has a central processor, a main memory controlled by a memory controller, and a number of peripheral processors (running such equipment as terminals, printers, telecommunications, and the like). The machine further provides a cache memory. A cache is a high speed memory local to the central processing unit and containing a time-varying subset of the contents of main memory.

A cache can greatly decrease the average memory access time for the central processor memory operations, since a very high proportion of memory reads can be satisfied out of the high speed cache. For a minority of memory read attempts, it is necessary to halt the operation of the central processor in order to bring in the requested data from main memory. In the machine described herein, the cache is read directly by the central processor, and is written by cache write circuitry in response to either a cache miss or a central processor main memory write operation. The peripheral processors read and write main memory through the memory controller, but do not read or write the cache, which is reserved for the central processor operations.

Three problems, among others, arise in running such a cache, all of which decrease the operating speed of the data processing machine.

First, although the peripheral processors do not write the cache, when they write to a location in main memory, it is necessary to check the cache to find out whether the contents of that main memory location have been brought into the cache, and if so, it is necessary to invalidate the cache entry (by setting a valid/invalid bit to a state indicating "invalid"), since the entry no longer corresponds exactly to the contents of main memory. This means that at a particular time there may be contention between the operation of attempting to read the cache, and the operation of attempting to check the cache contents after a peripheral processor main memory write operation (tag check).

Second, since the cache cannot be written and read simultaneously, there may at any particular time be contention between the central processor, attempting to read the cache, and the cache write logic, attempting to write to the cache in response to a previous cache miss (cache update). There may also be contention if the cache write logic is attempting to write an invalid bit after a previous tag check has demonstrated a tag match condition.

Finally, at any particular time there may be contention if the central processor tries to read the cache while the memory controller is writing to the cache to update it after a previous central processor write to main memory.

In prior art machines, the cache has been operated in such a way that (1) overhead time must be spent in settling the contentions, particularly in the first case; (2) on a cache update after a previous cache miss, it has been necessary to keep the central processor stopped during a cache cycle dedicated to updating the cache contents; and (3) it has been necessary to stop the central processor during memory cycles dedicated to updating the cache contents after a central processor write. All of these occurrences cause delays in memory access and consequent degradation in the operation of the central processor.

The present invention avoids all these disadvantages.

A cache generally has an operating cycle of the same length as the memory operation microinstruction cycle of the central processor. In the data processing machine of the invention, the cache operating cycle is divided into two subcycles dedicated to mutually exclusive operations. The first subcycle is dedicated to receiving a central processor memory read request, with its address. The second subcycle is dedicated to every other kind of cache operation. These are in particular either (a) receiving an address from a peripheral processor for checking the cache contents after a peripheral processor write to main memory, or (b) writing anything to the cache, including an invalid bit after a cache check match condition, or data after either a cache miss or a central processor write to main memory. By this means, contention is eliminated, so that overhead time need not be spent in resolving the contentions, and write operations become "transparent" to the central processor reading of the cache. From the viewpoint of the central processor, the cache is always available for read operations. The central processor can continue uninteruptedly to read the cache on successive central processor microinstruction cycles, regardless of the fact that the cache contents are being "simultaneously" checked, invalidated or updated after central processor writes. After a cache miss, although the central processor must be stopped to permit updating, it can resume operations a cycle earlier than is possible without the divided cache cycle.

Further, the implementation of a memory management structure according to the invention is particulary economical of circuitry, reducing both cost and space requirements.

According to the invention, a data processing machine has a central processor having memory address register means for providing memory address signals and memory data register means for receiving and providing data signals, and a control store connected to the central processor and providing control signals representing microinstructions thereto. Particular ones of the control signals within a said microinstruction represent read or write memory access operations; the central processor is responsive to the memory access control signals to generate memory address signals and to place them in the memory address register. The data processing machine further has physical memory addressable by the memory address signals and adapted for storing data signals.

The physical memory comprises a relatively slow access main memory, and a relatively fast access cache memory. The central processor memory address register is connected to the physical memory for providing the memory address signals thereto. The central processor further provides the memory access control signals to the physical memory. The data processing machine further has master timing means connected to each of the central processor and the physical memory and providing timing pulses thereto. Particular timing pulses define a central processor operating cycle, which has a fixed length for operations including a memory access. At least one peripheral processor is connected to the physical memory for read and write access thereto; the peripheral processor provides memory address signals, memory access control signals and data signals to the physical memory and receives data signals therefrom.

The cache memory has cache memory timing means responsive to the master timing means and providing a plurality of timing pulses defining a cache operating cycle. The cache has data signal storage means for storing data signals, addressing means for applying the memory address signals received by said physical memory to address the data signal storage means, comparator means responsive to the applied address signals and the stored data signals for generating an output representative of the presence or absence of particular data in the cache, and signal generating means responsive to the output of the comparator means for generating a condition signal having one of two states, representative of the presence or absence of the particular data.

The cache addressing means is responsive to the cache memory timing means to dedicate a first portion of the cache operating cycle to applying only the address signals received from the central processor to the cache data signal storage means and the comparator means; the cache addressing means is responsive to the cache memory timing means to dedicate a second portion of the cache operating cycle to one of several operations including applying the address signals received from a peripheral processor to the cache data signal storage means and the comparator means.

The master timing means is responsive to a first state of the condition signal, representative of the absence of the particular data from the cache data storage means, to inhibit the central processor timing pulses and thereby to stop the central processor. The physical memory is responsive to the first state of the condition signal, together with the memory access control signals received from the central processor, to perform a main memory access operation comprising the application of the memory address signals received from the central processor to the main memory to address the particular data, and the provision of the particular data to the central processor. The cache signal generating means is responsive to the completion of the main memory access operation to generate the condition signal having its second state, and the master timing means is responsive to the second state of the condition signal to enable the central processor timing pulses and thereby to restart the central processor.

The physical memory further comprises cache write means. The cache further has validity information storage means associated with the data storage means and comprising a plurality of valid bits each having one of two states and addressable by the memory address signals. The cache write means is responsive to the output of the comparator means, generated in response to the application of the peripheral processor memory address signals to the cache data storage means and comparator means, to perform a first write operation comprising applying the peripheral processor memory address signals to address a location in the validity information storage means, and setting the valid bit in the location to a first state representative of invalidity. The cache write means is responsive to the cache timing means to perform the first write operation during the second portion of a subsequent cache operating cycle.

The cache signal generating means is also responsive to a valid bit first state to generate the condition signal having the first state.

The cache write means is responsive to the completion of the main memory access operation, and to the memory address signals and memory access control signals received from the central processor, to perform a second write operation comprising applying the memory address signals to address a location in the cache data storage means, and writing the obtained particular data into the location, the cache write means being responsive to the cache timing means to perform the second write operation during the second portion of a cache operating cycle.

Other objects, features and advantages will appear from the following description of a preferred embodiment, taken together with the accompanying drawings in which:

FIGS. 21, 22 and 23 are timing charts showing portions of the operation of the data processing machine of the invention.

Figure 1:
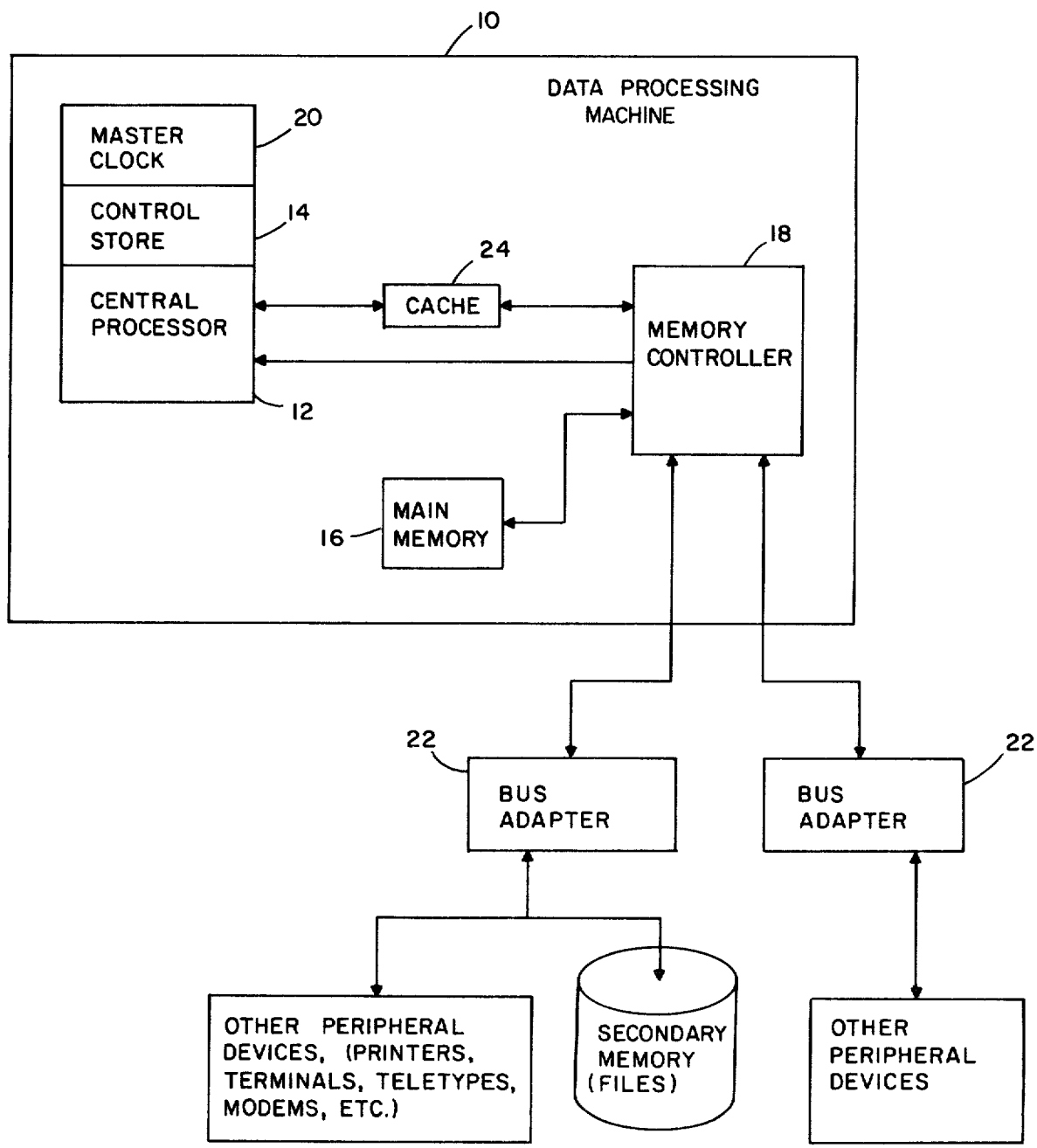
FIG. 1 is a simplified diagrammatic view of a data processing system having a data processing machine according to the invention.

Referring now to the drawings, and particularly to FIG. 1, the entire system is seen in simplified form. The data processing machine 10 provides a central processor 12, a control store 14, and a master clock 20. There is further provided a main memory 16, access to which is controlled by a memory controller 18. Various peripheral devices (terminals, printers, disks, tapes, telecommunications devices, and the like) are attached to data processing machine 10 and with it comprise the system.

Each peripheral device contains a processor, called a peripheral processor. Several peripheral processors are connected to one of the bus adapters 22, which in turn is connected to memory controller 18. There may be several bus adapters. The purpose of bus adapter 22 is to buffer between the 64-bit data lines within the data processing machine and the 16-bit data lines which connect the peripheral devices to machine 10. Memory controller 18 provides access to main memory 16 for the central processor and the peripheral processors; it may also transmit instructions from central processor 12 to the peripheral processors, in a manner not pertinent to the present invention.

Central processor 12 is connected to a high speed local memory or cache 24, which contains a time-varying subset of the data stored in main memory. Cache 24 is also connected to memory controller 18. The particular cache in the preferred embodiment is direct-mapped, and contains 32K bytes. It employs a write-through strategy; that is, the cache is updated whenever the central processor write to main memory.

Cache 24, main memory 16, and memory controller 18 together comprise the physical memory of the data processing machine.

Figure 2:
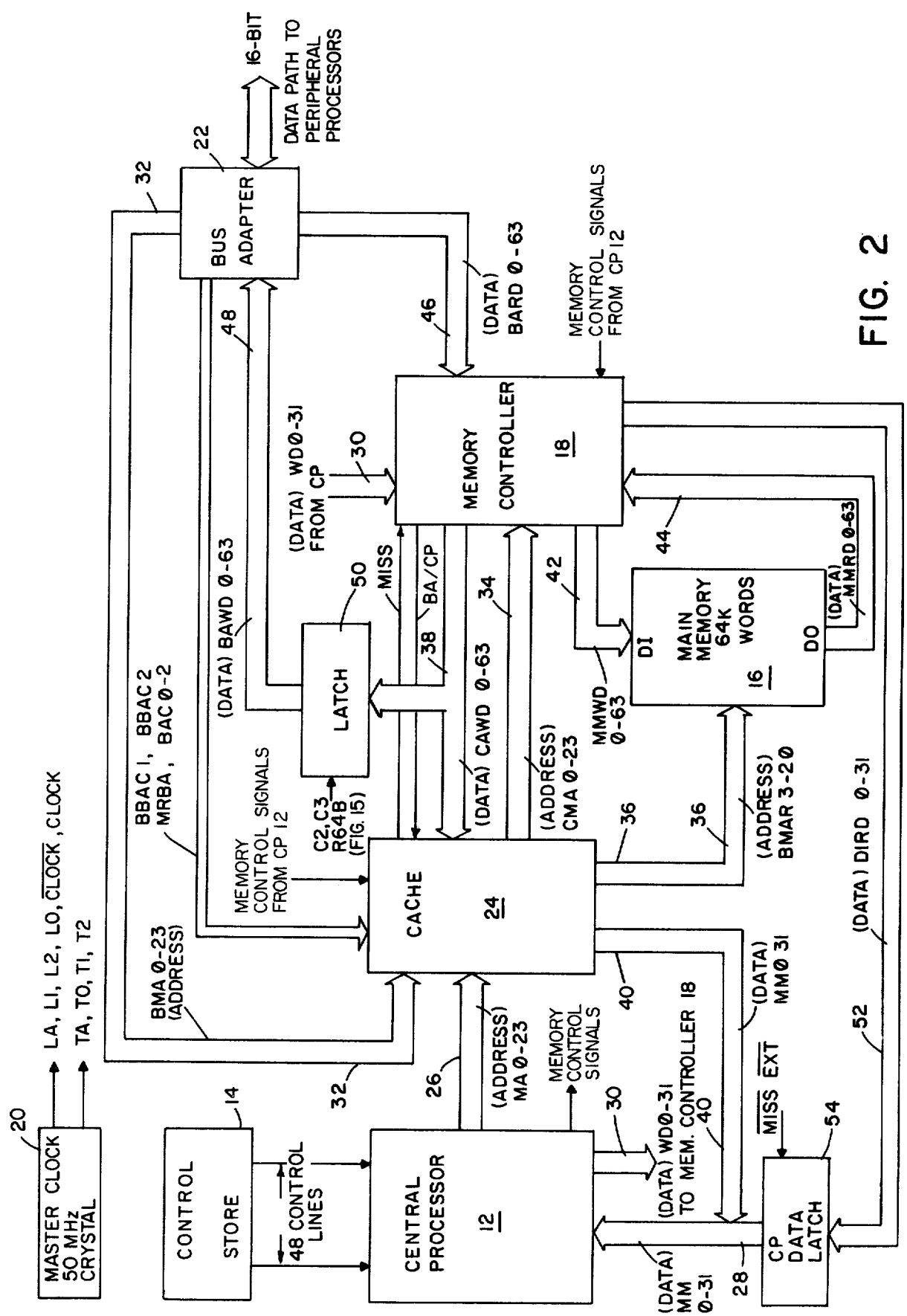
FIG. 2 shows the data and address paths through the data processing machine.

The data and address paths through the system are shown more particularly in FIG. 2. Central processor 12 has a 24-bit address bus 26, carrying the address lines designated by the mnemonic "MA (for Memory Address) 0-23" to cache 24. Central processor 12 has a 32-bit data-in bus 28, carrying the data lines designated by the mnemonic "MM (for Main Memory) 0-31", and a 32-bit data-out bus 30, carrying the data lines designated by the mnemonic "WD (for Write Data) 0-31".

Cache 24 receives the address lines MA 0-23 on bus 26 from central processor 12, and in addition is connected to bus 32, which carries address lines designated by the mnemonic "BMA (for Bus Adapter Memory Address) 0-23" from bus adapter 22. This address information is used to keep up to date the information in the cache when corresponding information in main memory is changed by one of the peripheral processors, as will be described in more detail in what follows.

Cache 24 is connected to output address bus 34, carrying the address lines designated by the mnemonic "CMA (for Cache Memory Address) 0-23" to memory controller 18. Further, cache 24 is connected to bus 36, carrying the address lines designated by the mnemonic "BMAR 3-20" (for Buffered Memory Register) to main memory 16.

Cache 24 has one data-in bus and one data-out bus. The data-in bus 38 carries the data lines from memory controller 18 designated by the mnemonic "CAWD (for Cache Write Data) 0 - 63". Data bus 38 is used by memory controller 18 to write data to the cache after a cache miss, or in response to a central processor main memory write, as will be described in more detail in what follows. Bus 38 is also used, in a manner not pertinent herein, to transmit data to bus adapter 22. The data-out bus 40 carries the data lines from cache 24 designated by the mnemonics MM 0-31, for input to central processor 12 on bus 28. Data bus 40 provides data to central processor 12 after a cache hit in response to a central processor read request, as will be described in more detail in what follows.

Main Memory 16 receives the address lines BMAR 3-20 from cache 24, as previously described, on bus 36, together with memory module select signals, not shown in the Figure and not pertinent to the present invention. Main memory 16 has a 64-bit data-in bus 42 connected to memory controller 18, carrying the data lines designated by the mnemonic "MMWD (for Main Memory Write Data) 0-63". All data written to main memory 16 is input on bus 42. Main memory 16 has a 64-bit data-out bus 44 connected to memory controller 18, carrying the data lines designated by the mnemonic "MMRD (for Main Memory Read Data) 0-63". All data read from main memory 16 is read out on bus 44.

Bus adapter 22 outputs address bits to cache 24 over bus 32, previously described, in response to peripheral processor memory access requests, in a manner not pertinent to the present invention. Bus adapter 22 has a 64-bit data-out bus 46 connected to memory controller 18, carrying the data lines designated by the mnemonics "BARD (for Bus Adapter Read Data) 0-63", and a 64-bit data-in bus 48 connected through buffer 50 to bus 38, carrying the data lines designated by the mnemonic "BAWD (for Bus Adapter Write Data) 0-63". Note that "Bus Adapter Read Data" refers to data read from the peripheral processor to main memory 16, while "Bus Adapter Write Data" refers to data read from main memory 16 and written to a peripheral processor.

In addition, bus adapter 22 outputs certain control signals to cache 24. These are MRBA (bus adapter memory request signal), and BAC 0-2 (bus adapter control signals). The BAC 0-2 signals are latched within the cache for convenience of use; in their latched form they are designated BBAC 0-2.

The memory controller 18, as has been described, receives data over bus 44 from main memory 16, over bus 46 from bus adapter 22, or over bus 30 from central processor 12. Memory controller 18 receives address data on bus 34 from cache 24. Memory controller 18 outputs data on bus 38 to cache 24 and to data latch 50 for output to bus adapter 22. Memory controller 18 further outputs data to central processor 12 (via latch 54) on bus 52, carrying the data lines designated by the mnemonic "DIRD (for Diagnostic or Read Data) 0-31". On the occasion of a main memory read following a cache miss, as will be explained more fully in what follows, a Miss Extended signal, derived in response to the cache miss condition in a manner to be described in what follows, allows the data from bus 52 to pass through latch 54 to bus 28 and thence to the central processor.

Figure 3:
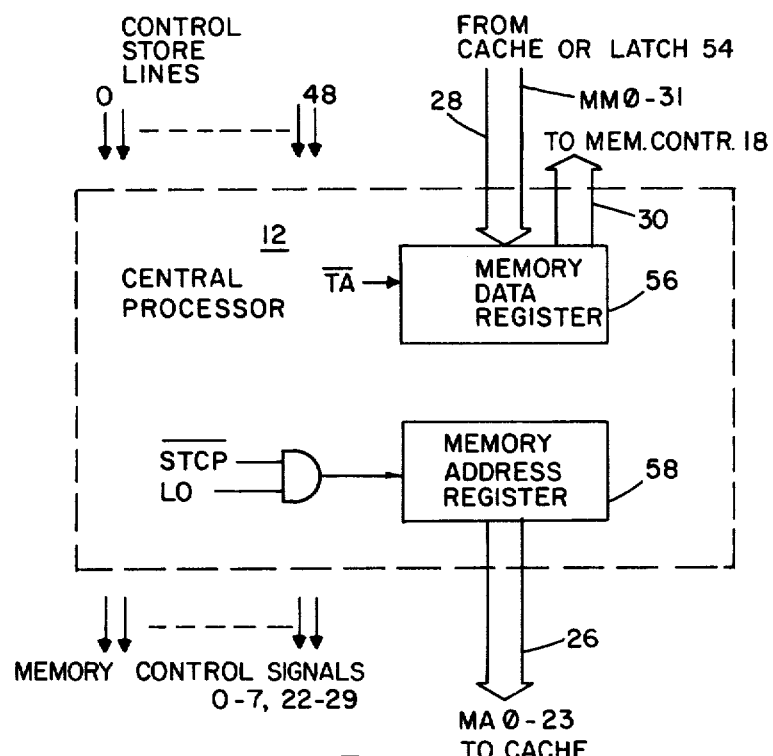
FIG. 3 shows certain features of the central processor of the data processing machine.

Referring to FIG. 3, only two elements within central processor 12 are pertinent to the present invention. These are memory data register 56, which receives data over the lines carried by bus 28 (MM 0-31), and memory address register 58, which is loaded (in a manner not pertinent to the present invention) with the address to be output over bus 26 (MA 0-23) to the cache.

Figure 12:
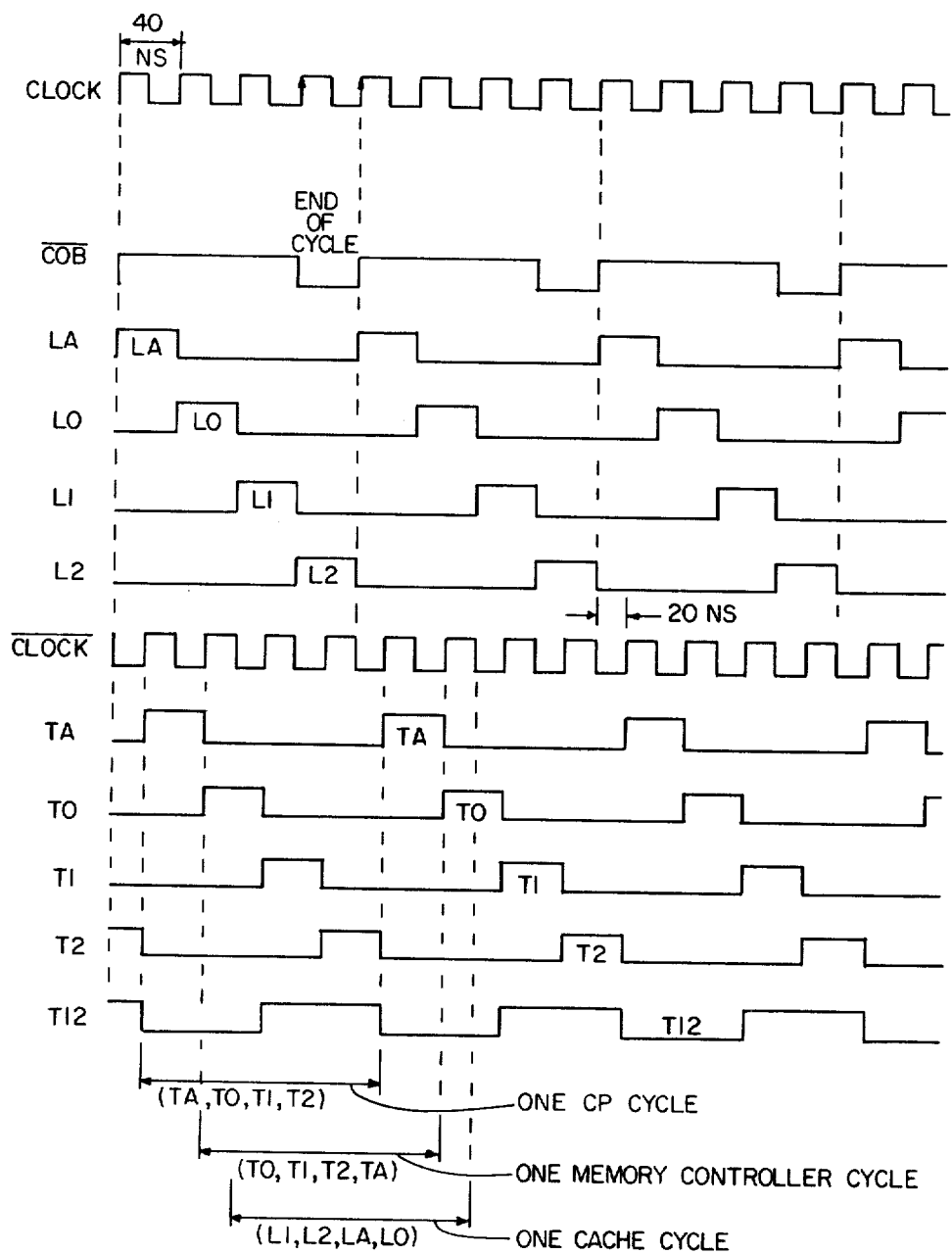
FIG. 12 shows fundamental system timing signals generated by the mater clock of FIG. 11.

If the central processor is not stopped (that is, when the signal STCP Inverse is high: the derivation of this signal will be described in what follows), the address signals from memory address register 58 are transferred to cache 24 at time L0 (the timing signals including L0 will be described in connection with FIG. 12).

Referring now to FIGS. 4-9, various formats of data and addresses are shown that are pertinent to the operation of the data processing machine.

Figure 4:
FIGS. 4 through 9 illustrate the formats of various data and addresses pertinent to the invention.
Figure 5:
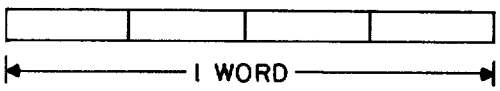
Figure 6:
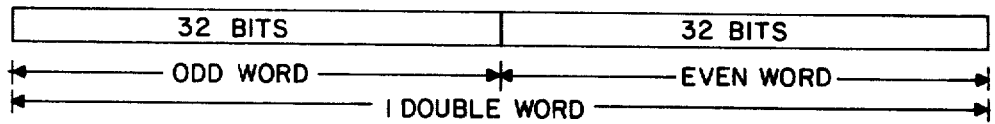

FIG. 4 illustrates a byte of data, defined as comprising 8 bits. FIG. 5 illustrates one word of data, defined as comprising four bytes, or thirty-two bits. FIG. 6 illustrates a doubleword, defined as comprising one even word and one odd word, each of thirty-two bits. Data is stored in main memory in doubleword units.

Figure 7:
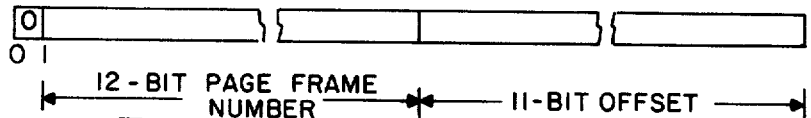

Referring now to FIG. 7, the 24-bit physical address is shown as it is seen by main memory; the address comprises a 12-bit page frame number (expandable by two if the memory is enlarged), and an 11-bit offset, locating the byte within the page.

Figure 8:
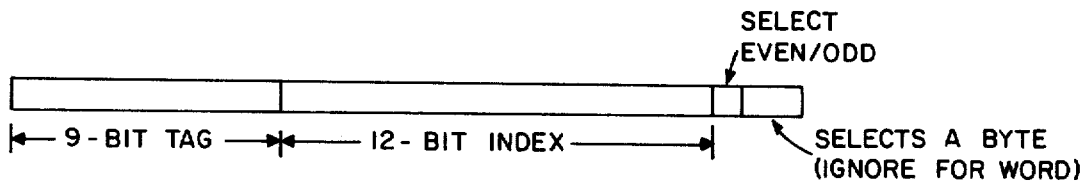
Figure 9:
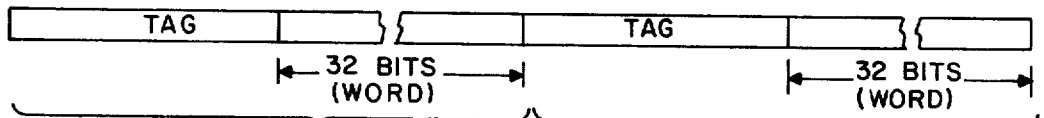

FIG. 8 shows the same 24-bit physical address as it is interpreted by the cache; the address comprises a 9-bit tag and a 12-bit index. The low-order two bits are ignored, since they are used to select a byte within a word, whereas the cache always transmits a word to the central processor, which must then select the particular byte that is wanted. The third bit from the right selects the even or odd word of a doubleword pair. FIG. 9 shows the format of data as stored in the cache. The even and odd words of a doubleword pair are stored, together with the 9-bit tag for each. This entire 72-bit unit is addressed by the 12-bit index of the physical address.

The employment of an index and tag to address a direct-mapped cache is well understood in the art of designing data processing machines. The general aspects of managing cache memories are described, for example, in *Computer Engineering*, by Bell, Mudge and McNamara (Digital Press, 1978).

Figure 10:
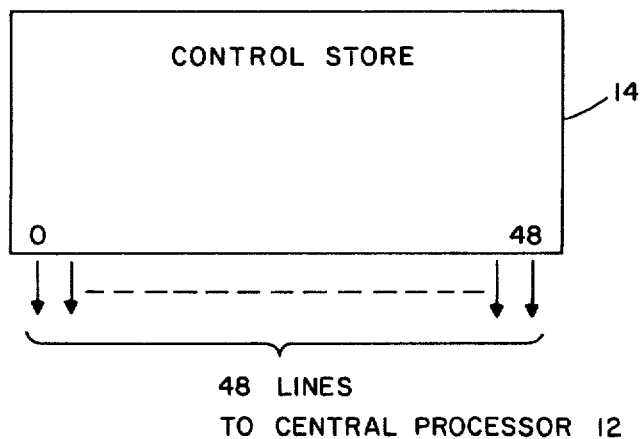
FIG. 10 shows pertinent features of the control store.

Referring now to FIG. 10, control store 14 contains control signals, which are accessed in groups of forty-eight signals output on forty-eight parallel lines. The signal on each line may be either High (1) or Low (0), and is applied directly to the hardware circuitry of the central processor 12 to control the operation thereof.

Of the forty-eight signals on the lines, comprising a microinstruction, only certain ones are pertinent to the present invention. These are signals 0-6 (called the "micro opcode"), which are decoded as a group to provide one of a number of signals indicating the operation to be performed (such as add, move, compare, shift) and signals 22 through 29, which are decoded as a group to provide one of a number of signals indicating a memory operation (read or write, with details of memory address register selection, memory data register selection, and other matters not pertinent to the present invention). These signals are indicated in FIG. 2 as "memory control signals". Particular ones of the control signals accessed by the central processor are connected directly from the central processor to the cache and the memory controller, as will be discussed in more detail in what follows. The accessing and decoding of such groups of control signals (microinstructions) during operation of a data processing machine is well known in the art, and will not be described herein.

Figure 11:
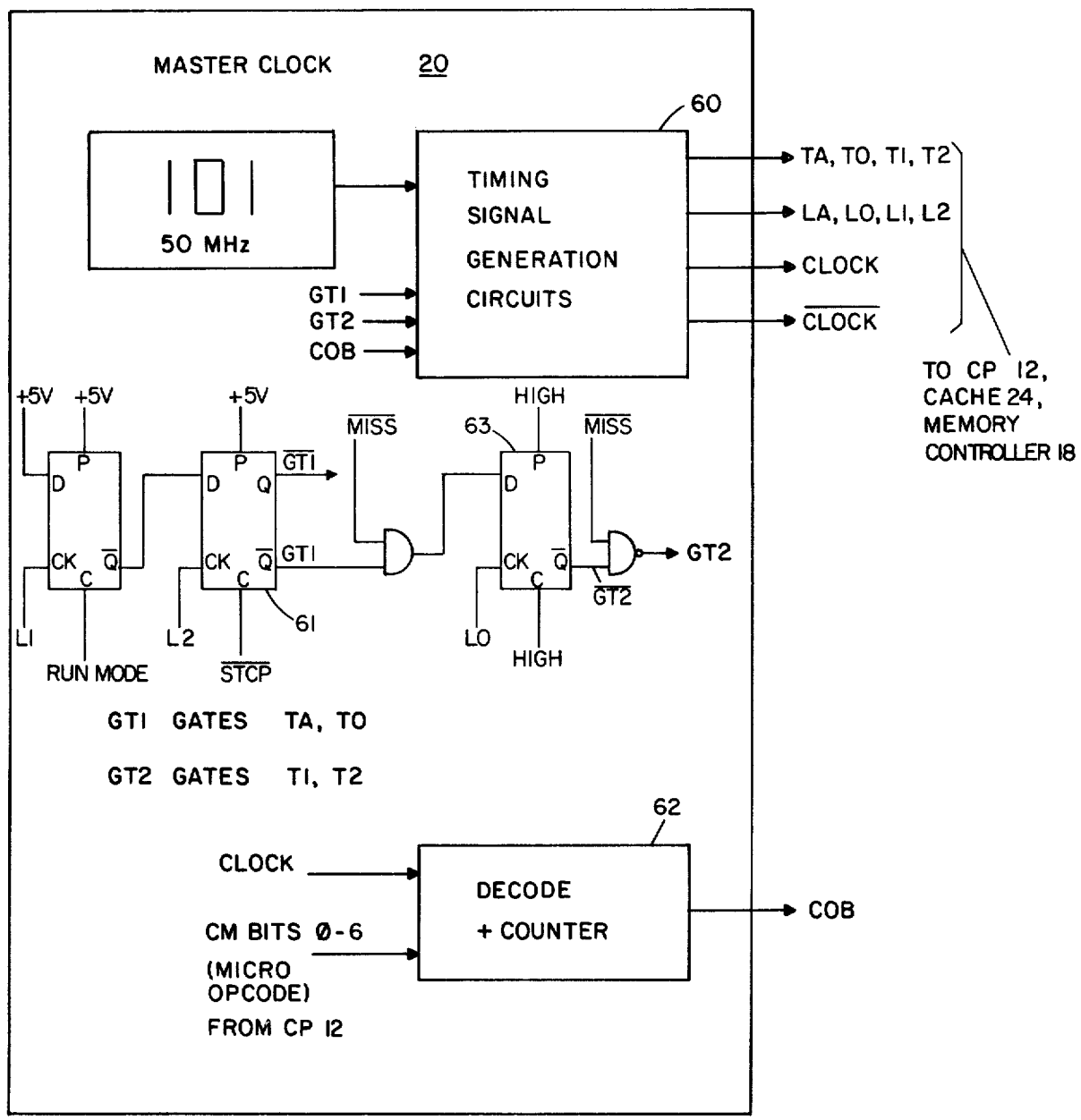
FIG. 11 shows the master clock.

Referring now to FIG. 11, pertinent portions of the system master clock 20 are shown. The master clock for the data processing machine is driven by a 50 Mhz crystal, whose output is input to timing signal generation circuitry 60, which in a manner well known in the art generates appropriate timing signals for the system. The basic timing signal (CLOCK) has a period of 40 nanoseconds and a 20 nanosecond pulse width. The signals TA, T0, T1, T2; LA, L0, L1, L2; CLOCK; and inverse CLOCK are represented in the timing chart of FIG. 12. These pulses are input to central processor 12.

Signals LA, L0, L1, L2 are free-running, while TA, T0, T1, T2 are dependent on operating conditions in the central processor and elsewhere. Further L and T pulses may be generated, under conditions to be described, but are not shown in FIG. 11 and are not pertinent to the present invention.

Two gating signals, GT1 and GT2, are generated in a manner to be described more particularly in what follows. Signal GT1 gates (enables or inhibits) the central processor timing signals TA and T0; signal GT2 gates the timing signals T1 and T2. The central processor cycle is defined as beginning with a TA pulse. Thus the operation of the central processor can be stopped after T0 or after T2. Signal GT2 is normally a slave to signal GT1, but on the occurrence of a "Miss" signal, in a manner to be described in what follows, GT2 is inhibited, so that pulses T1 and T2 will not occur, even though pulses TA and T0 have occurred.

The length of the microinstruction cycle of the central processor varies according to the nature of the microinstruction. The central processor cycle (of any length) is defined as beginning at TA. Most microinstructions, including those which involve memory operations and are pertinent to the present invention, require 160 nanoseconds for execution. For these microinstructions, the pulses TA, T0, T1 and T2 comprise the cycle, as seen in FIG. 12. Other instructions may require longer than 160 nanoseconds for execution; for such instructions, further T pulses must be generated (T5 through T8, not shown). To determine the number of T pulses to be generated, the control signals 0-6 (the "micro opcode") of the current microinstruction controlling central processor 12 are input from central processor 12 to a decoder and counter 62 together with the CLOCK signal from circuitry 60; according to the nature of the operation as determined by the decoder, the counter is set, and at the appropriate time the signal "COB" (end of cycle) is generated to mark the end of the instruction cycle. This signal resets circuitry 60 and causes the next cycle to begin with a TA pulse.

The CLOCK signal is input directly to cache 24 and to memory controller 18, where similar timing circuitry is provided to generate synchronous L and T pulses. However, unless the gating signals GT1 and GT2 are specifically shown, the T pulses within the cache and memory controller do not stop when the central processor stops.

The cache cycle is the same length as the central processor read or write cycle, that is, 160 nanoseconds. However, it is defined as beginning with the L1 pulse and comprising the pulses L1, L2, LA, L0, which, as is seen from FIG. 12, means that the cache cycle is offset by 60 nanoseconds from the central processor cycle. The memory controller cycle is offset by 40 nanoseconds from the central processor cycle, and comprises the pulses T0, T1, T2, TA.

Further, some timing pulses from the central processor are input directly to cache 24 to cause events synchronized with particular central processor events. Such cache events cannot occur when the central processor is stopped, although the cache is not stopped.

Figure 13:
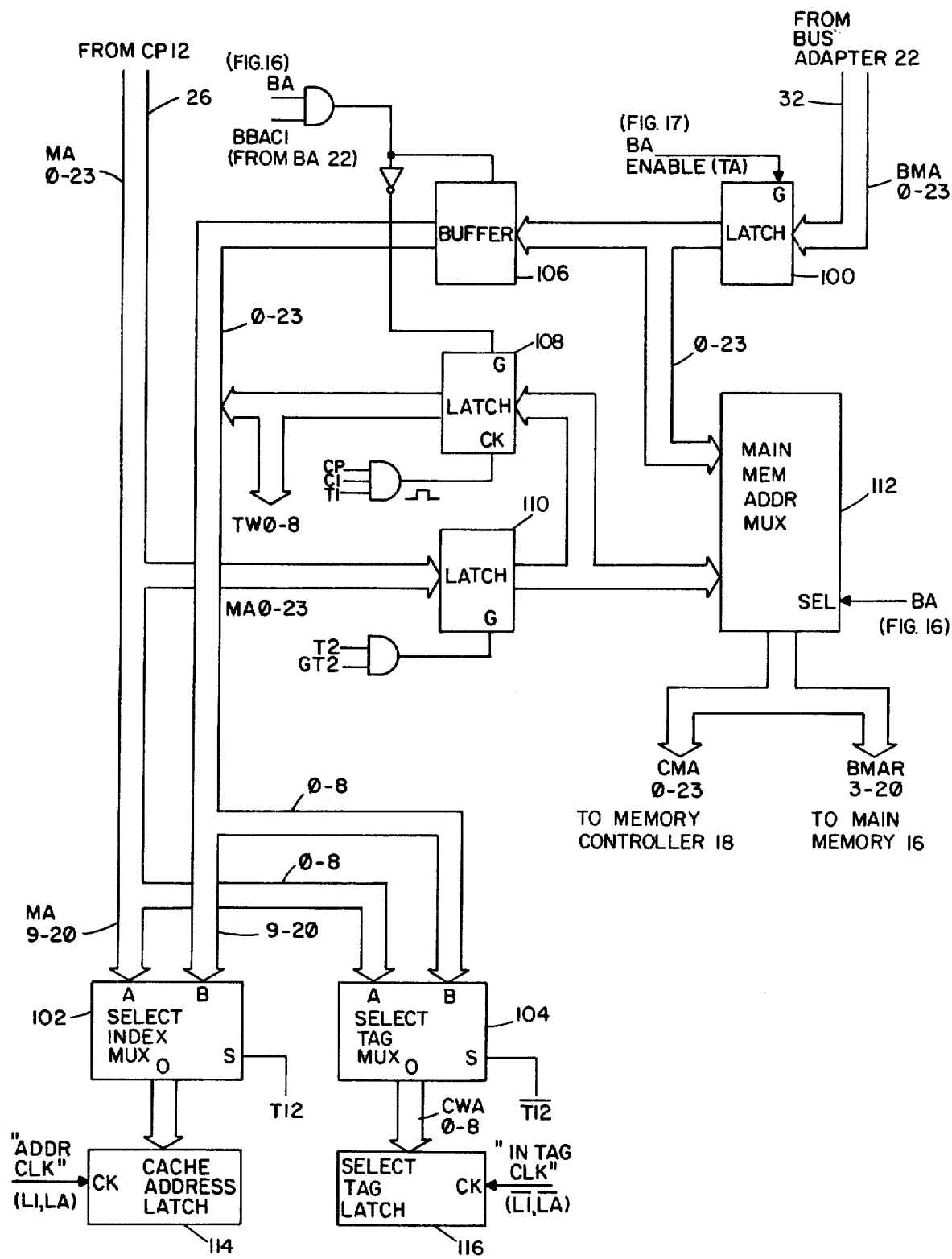
FIG. 13 shows a portion of the cache memory related to addressing functions.
Figure 14:
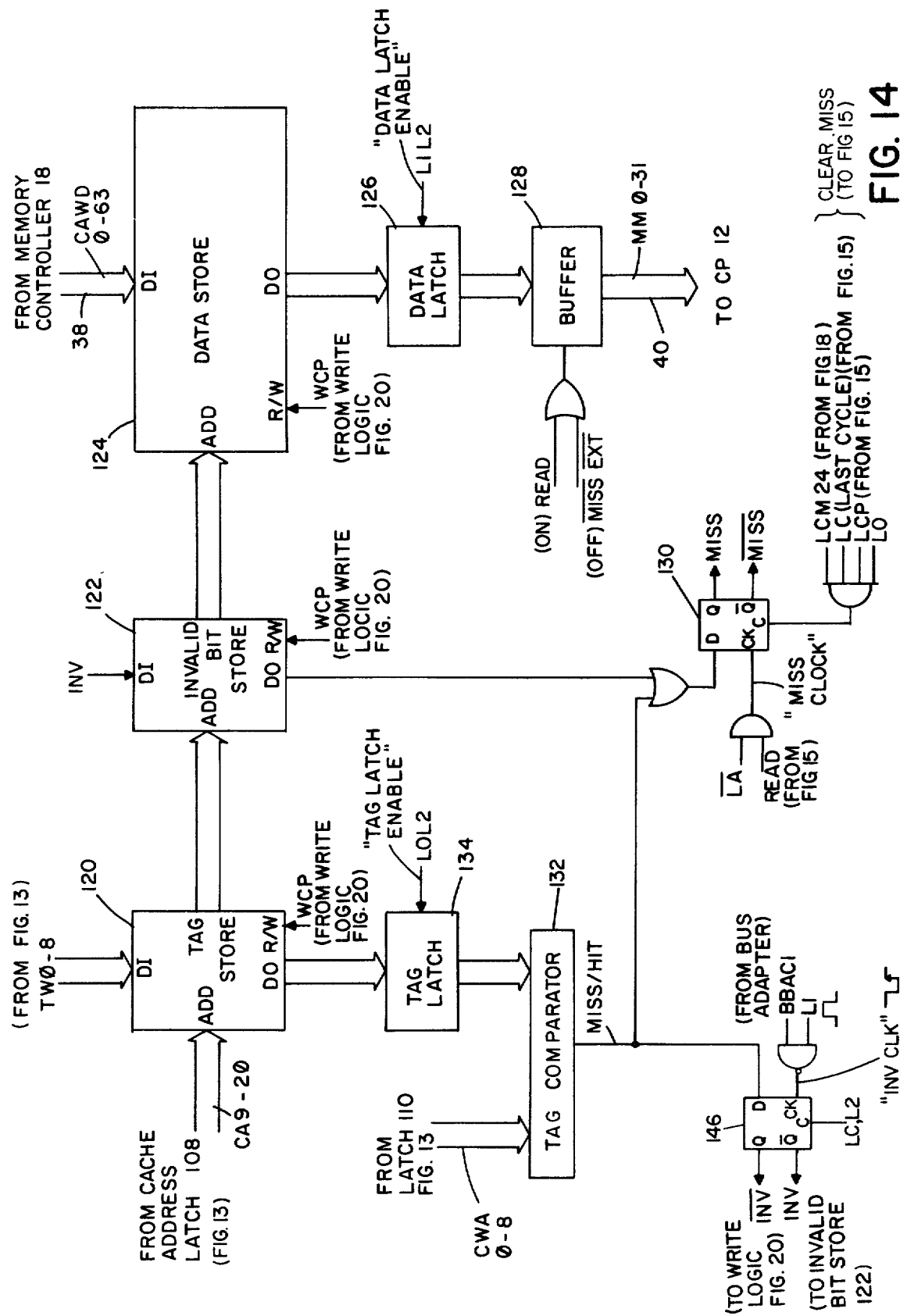
FIG. 14 shows a portion of the cache related to data storage.
Figure 15:
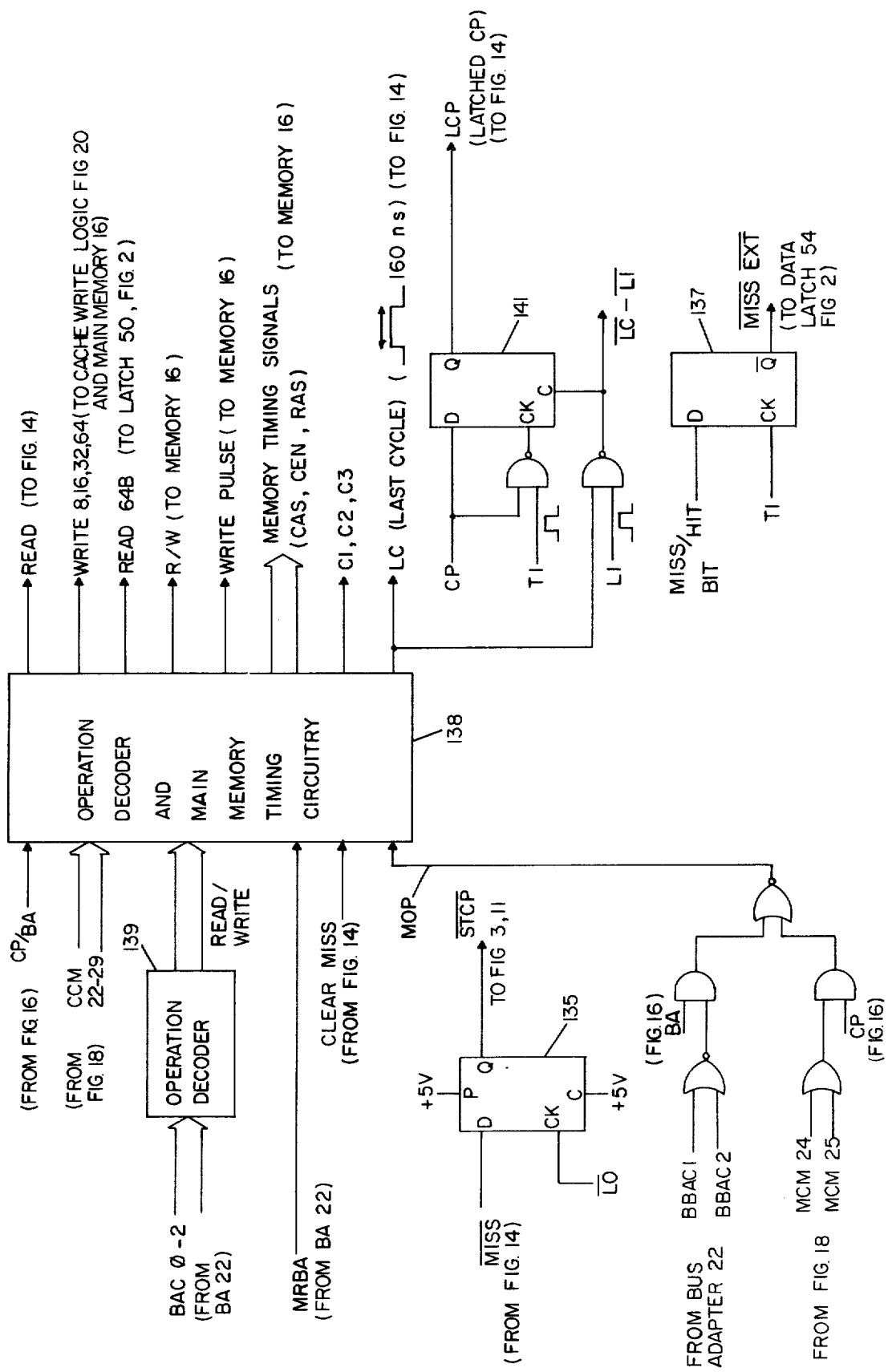
FIG. 15 shows certain portions of the cache related to memory control and other control functions.

Referring to FIGS. 13, 14, 15, 17, 18 and 20, cache 24 generally comprises an addressing portion (FIG. 13), a data storage and tag comparison circuitry portion (FIG. 14), and various control signal decoding circuitry (FIGS. 15, 17, 18 and 20). The circuitry of FIG. 16, and portions of the circuitry of FIG. 15, are physically located within the cache but are conceptually parts of the memory controller, since their functions are concerned with the management of main memory.

Figure 18:
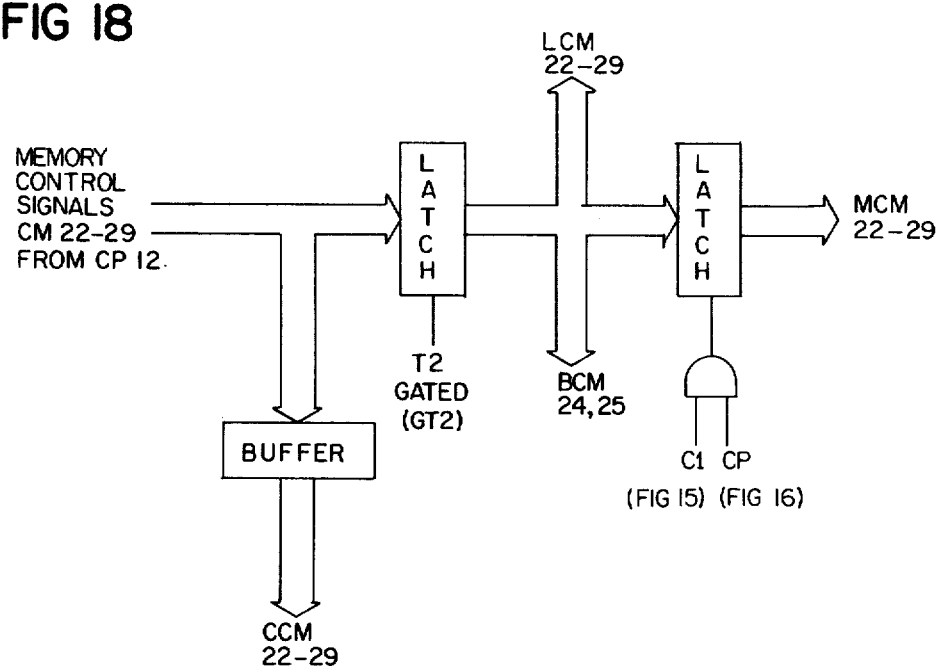
FIG. 18 shows cache circuitry related to the use of certain control store signals by the cache.

Referring first to FIG. 18, the central processor address (not shown in this Figure) reaches cache 24 together with the control signals CM 22-29 of the 48-signal group controlling current central processor operations. As has been described, control signals 22-29 are memory access control signals which control the nature of the memory operation to be performed at the address specified by the central processor. For convenience of use in cache 24, certain of these signals are delayed by being latched or buffered, and the delayed signals are referred to as "CCM", "BCM", "LCM" or "MCM" according to their delays, as shown in the Figure.

Figure 16:
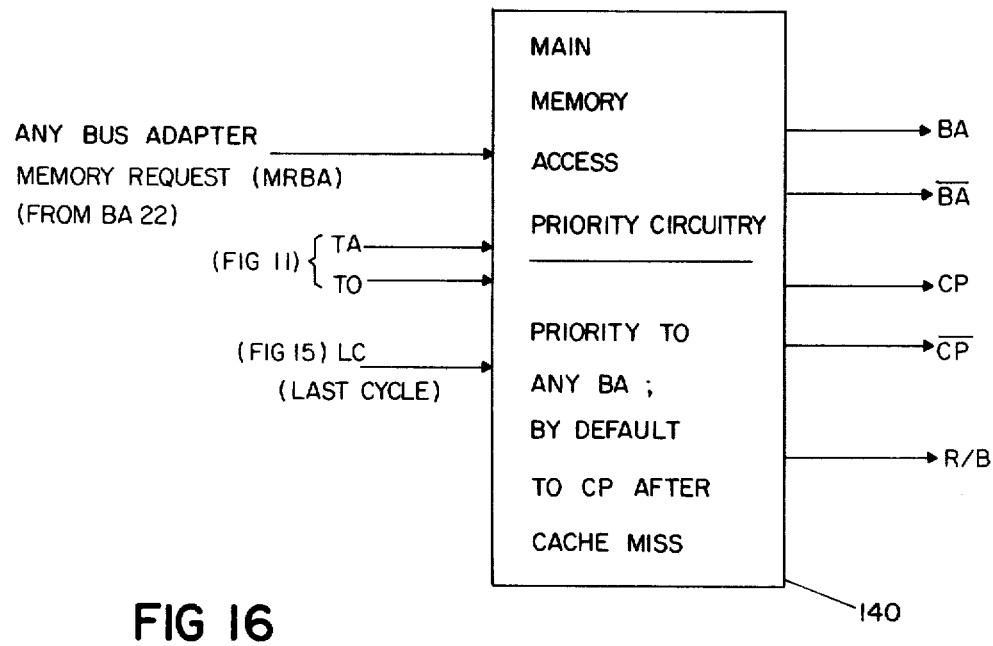
FIG. 16 shows portions of the circuitry related to memory access priority.

Referring now to FIG. 16, memory controller 18 provides main memory-access priority determining circuitry 140. This circuitry is designed to give priority of main memory access to any bus adapter request (on behalf of a peripheral processor). Only when no bus adapter memory request is pending does central processor 12 gain access to main memory, either to write or to read after a cache miss. The input signal LC (Last Cycle) comes from the memory controller timing circuitry of FIG. 15, to be described, and is generated at the end of a memory access operation. On the completion of any current memory operation, if no bus adapter memory request is pending, by default BA goes low, and the waiting central processor address is transmitted to main memory 16. Thus after a cache miss there may be a delay of some cycles until main memory is available to the central processor. During this time the central processor remains stopped, as will be described.

This allocation of priority for main memory access between the central processor and the bus adapter, conditioned on the presence or absence of bus adapter memory requests, must be clearly distinguished from the division of the cache cycle between the central processor memory reads and other operations, to be described in more detail in what follows. The circuitry for the division of the cache cycle is free-running and operates as described whether or not any request from either the central processor or a bus adapter is pending.

Figure 17:
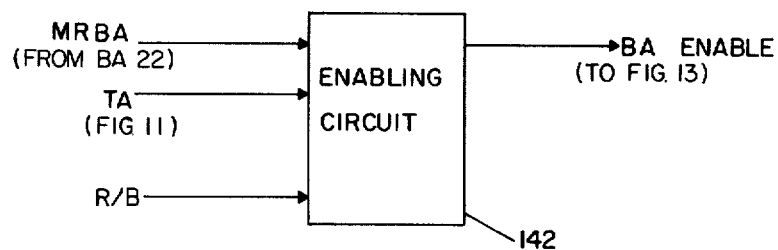
FIG. 17 shows cache circuitry generating a control signal for peripheral processor memory operations.

Referring to FIG. 17, a "BA Enable" signal is generated by a flip flop in enabling circuit 142 at time TA in response to any bus adapter memory request (MRBA) provided the memory control circuitry is ready (R/B). The BA Enable signal is applied to the circuitry of FIG. 13 to input the address of the BA memory operation, for purposes of a cache check or invalidate procedure, to be described.

The timing for main memory 16 is largely generated by the circuitry of FIG. 15, the major part of which is functionally part of memory controller 18. Methods of timing and operating a main memory for a data processing machine of the kind described herein are in general well understood in the art and form no part of the present invention. Therefore, the generation of these timing signals will not be described in detail; rather, those portions relevant to the operation of the invention will be indicated.

Referring now to FIG. 15, the control signals CCM 22-29 (from FIG. 18) are decoded in decoding circuitry 138 to determine whether the central processor memory operation is a write or a read. If the operation is a read, the control signals when decoded result in the generation of a "Read" signal, indicating that the central processor memory operation is a read, to be serviced in the cache. This signal is required within cache 24 to permit the generation of a cache miss signal, as will be explained.

If the central processor memory operation is a write (to main memory), the control signals CCM 22-29 when decoded provide the write signals WRITE 8 (i.e. bits), WRITE 32, and WRITE 64, which specify the operations of writing a byte, a word or a doubleword. (Unlike the peripheral processors, the central processor does not write a half word; therefore the signal WRITE 16 is not generated by the central processor control signals.) The BAC 0-2 signals (memory access control signals) from bus adapter 22 are similarly decoded in operation decoder 139 to derive read or write signals, input to circuitry 138. The bus adapter write signals may be WRITE 8, WRITE 16, WRITE 32 or WRITE 64. The MRBA (bus adapter memory request) signal is also input from the bus adapter 22.

The CP/BA input (from FIG. 16) represents the priority allocation for main memory access. (CP will be high when the central processor has priority; BA will be high when a peripheral processor has priority.) The Clear Miss signal is generated within cache 24 in a manner to be described, when the cache miss has been satisfied by a main memory operation and the requested data has been placed in the central processor memory data register 56 (FIG. 3). As is seen in the Figure, the "MOP" (memory operation) signal represents either a bus adapter memory operation (BBAC1, BBAC2 and BA priority) or a central processor memory operation (MCM 24 and 25, and CP priority).

Circuitry 138 generates appropriate memory control and timing signals from the described inputs. The generation of the control signals "WRITE 8", "WRITE 16", "WRITE 32", and "WRITE 64" has been described; "READ 64 B" specifies the operation of reading a doubleword. The R/W (Read/Write: R high for read, W high for write) signal and Write Pulse are conventional inputs to main memory 16. The Memory Timing Signals include CAS (column address strobe), CEN (column enable), and RAS (row address strobe), which are all conventional and are input to main memory 16 to address it in a known manner.

The signals C1, C2 and C3 are for internal use within the cache, and keep track of the three instruction cycles (160 nanoseconds each) required for a main memory operation. Their use will be explained in what follows. The signal LC (last cycle) is 160 nanoseconds long and is generally synchronized with the last cycle of the memory operation. The LC signal is input to reset flip flop 141, which delays the CP priority signal (from FIG. 16) to provide a latched CP signal (LCP) whose use will be explained. Flip flop 137 is used to delay the cache miss signal during a central processor Read operation, providing a "MISS EXT" (inverse) output whose use will be described.

The cache miss inverse signal is normally high, and maintains STCP inverse (stop central processor), output from flip flop 135, normally high. STCP inverse is input to the master clock (FIG. 11); it is also input to central processor memory address register 58 (FIG. 3). So long as STCP inverse remains high, the central processor is not stopped; the timing pulses TA, T0, T1, T2 are generated, and the central processor memory addresses are gated out of memory address register 58. When a cache miss signal is generated, in a manner to be described in connection with FIG. 14, cache miss inverse goes low, and at the next L1 timing pulse (L0 inverse is low) the output STCP inverse goes low. This signal stops the generation of T pulses for the central processor, and also prevents the next memory address from being latched out to the cache.

Referring now to FIG. 13, the portion of the cache 24 particularly relating to cache storage addressing and main memory addressing is shown. This circuitry divides the cache cycle and dedicates alternate cache subcycles to particular functions. The first cache subcycle is dedicated to processing a central processor read address; the second cache subcycle is dedicated either to processing a bus adapter read address for performing a cache check, or to writing the cache. Writing the cache may involve either writing the invalid bit of a particular cache entry after a cache check (performed in a previous cycle) has determined that a tag match condition exists, or writing the cache data store and tag to update the cache after a cache miss has been satisfied out of main memory 16, or after a central processor main memory write.

The circuitry of FIG. 13 receives addresses from two sources. One address (MA 0-23) is received from central processor 12 for a memory operation (read or write), and another address (BMA 0-23) is received from bus adapter 22 for a cache check or invalidate operation (resulting from a bus adapter main memory write operation). The circuitry of FIG. 13 determines which address goes to the comparison circuitry of FIG. 14 to be compared, and also which address goes to main memory 16 for the memory operation. Generally, this circuitry includes multiplexers 102 and 104 to select the index and tag to be applied to the cache storage and comparator of FIG. 14; latches 110 and 108 to hold the input central processor address for application to main memory 16 in case of a cache miss; and a multiplexer 112 to select the address to be sent to main memory 16 for a memory operation.

Note that the circuitry of FIG. 13 operates without reference to whether the central processor memory operation is a read or a write. The "Read" signal from FIG. 15 is input to FIG. 14, where the cache miss signal will be generated only for a read operation. For a central processor write operation, all the operations up to the generation of the cache miss signal are performed, but no miss signal is generated. Since, according to the invention, this subcycle is dedicated to processing a central processor memory operation address, no other operation could be performed during this subcycle, and therefore these "wasted" operations cost no time.

Still referring to FIG. 13, bus 26 carries address lines MA 0-23 from memory address register 58 of central processor 12 (FIG. 3), which is latched at L0 providing that the central processor is not stopped (STCP inverse is high). Bus 32 carries address lines BMA 0-23 from bus adapter 22. The address from bus adapter 22 is stored in latch 100, which is gated (at time TA) by the BA enable signal from FIG. 17.

Of the incoming central processor address bus 26, lines 9-20 (which carry the signals which comprise the index, see FIG. 8) are input to the Select Index Multiplexer 102, while lines 0-8 (the tag, see FIG. 8) are input to Select Tag Multiplexer 104. The incoming bus adapter address bus 32 is input through buffer 106, enabled on a "BA Write" (BBAC 1) signal from bus adapter 22, and is then similarly divided; lines 0-8 (the tag) are input to Select Tag Multiplexer 104, while lines 9-20 are input to Select Index Multiplexer multiplexer 102.

The inputs to Multiplexer 102 are selected by the timing signal T12, while the inputs to multiplexer 104 are selected by timing signal T12 inverse. Thus the multiplexers 102 and 104 are switched at the same time but in opposite senses; the central processor index is transmitted by multiplexer 102 when the bus adapter tag is transmitted by multiplexer 104. Referring to the timing chart of FIG. 12, it is seen that T12 is high during T1 and T2; therefore T12 is an 80 nanosecond wide pulse.

Multiplexers 102 and 104 are thus switched twice during each cache cycle (160 nanoseconds). During the first half of the cycle, the A inputs (central processor index) to select-index multiplexer 102 are transmitted to cache address latch 114; during the second half of the cycle the B inputs are transmitted. The B inputs may be either the bus adapter address from buffer 106, for a cache check (on BA priority, during a peripheral processor write to main memory); the same bus adapter address (held in buffer 106) for an invalidate bit write (after a previous cache check has resulted in a tag match condition); or a previously input central processor address (from latch 108). The previously input central processor address is either one for a read memory operation which has caused a cache miss, or one for a central processor write memory operation; in either case the address is now to be used as the address for a cache update write operation.

During the first half of the cycle the B inputs to select tag multiplexer 104 are transmitted to select tag latch 116 for input to the tag comparator (FIG. 14); during the second half of the cycle the A inputs to multiplexer 104 are transmitted to latch 116. The purpose of this timing arrangement will be explained in what follows.

Cache address latch 114 is latched by the "address clock" signal (L1 LA); select tag latch 116 is latched by the "in tag clock" signal (L1 LA inverse).

For each main memory operation (including a cache update after a miss), an address must be selected for application to main memory 16 for the memory operation. For each central processor operation, whether a memory operation or some other kind of operation, the central processor address (MA 0-23) is gated through latch 110 by timing signal T2 (provided central processor 12 is not stopped, GT2 high), and is applied to main memory address multiplexer 112 and to latch 108. If the operation is not a memory operation, or is a memory read and there is a cache hit, the contents of latch 108 are never used. If there is a cache miss, then the signals CP (central processor memory access cycle, from FIG. 16), T1, and C1 (from FIG. 15; Cycle 1, the first cycle of the memory operation to satisfy the miss) gate the address through latch 108 to multiplexer 102, to index the location in cache data store 124 for the update write after the completion of the memory cycle. The tag portion of the address is output as TW0-8 for writing into the cache storage, as will be described.

Because the central processor is stopped in response to a cache miss after timing interval T0 of its cycle, it may already (during TA, T0) have sent another address to cache for a memory read, before being stopped by the cache miss signal (as will be described). This address will not be lost, because it will be saved in latch 110, which will not be gated until the next T2 timing signal, after the cache miss signal is cleared. Therefore, during a main memory operation to satisfy a cache miss, latch 110 holds the address for the next memory operation, while latch 108 holds the address which caused the miss and which has just gone to the main memory for the current operation. When the memory operation has been completed and the data is to be written into the cache, the index for writing the cache is obtained from cache address latch 108. The tag is output as TW0-8 (tag write) to be written into cache tag store 120 at the same time.

Figure 19:
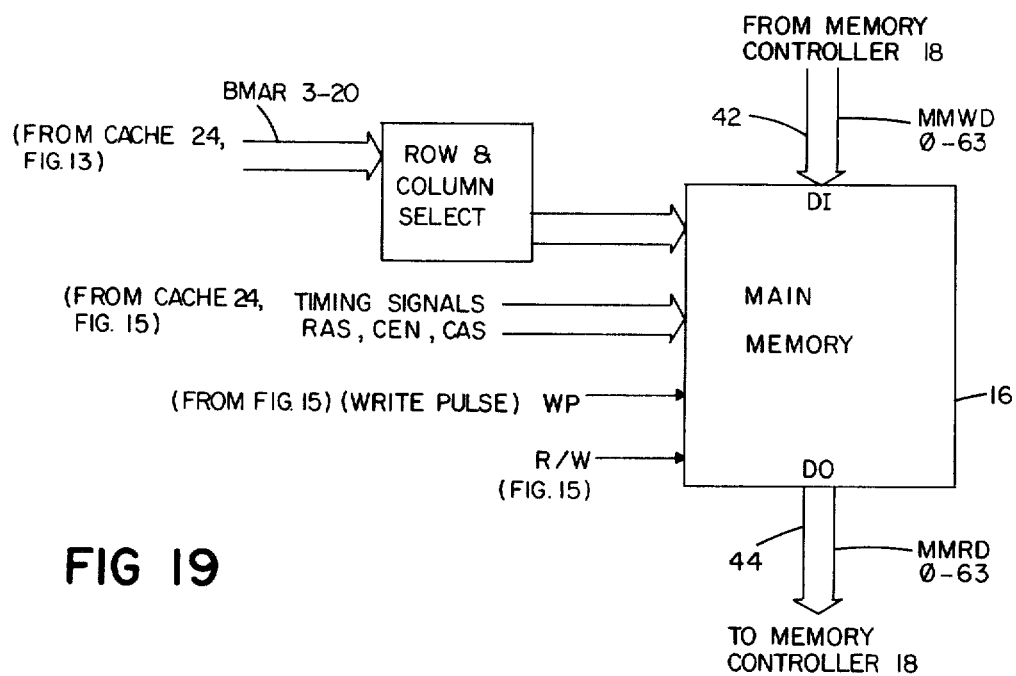
FIG. 19 shows the main memory.

The alternate inputs to main memory address multiplexer 112 are selected by the signal BA (high or low), from the priority circuitry of FIG. 16. The selected address signals (BMAR 3-20, with module select signals not pertinent to the invention) are output to address main memory 16 (FIG. 19), and to memory controller 18 (CMA 0-23). The memory controller employs the address signals to maintain a bus transaction log and for other purposes, none of which are pertinent to the present invention.

Referring next to FIG. 14, the storage portion of the cache is shown. This drawing has been simplified by not showing the actual division of the cache into even and odd portions, which is not pertinent to the operation of the invention. In effect, only one-half of the storage portion is shown. To visualize the even/odd arrangement of the cache, FIG. 14 up to the flip-flop 130 can be considered to represent either the even or the odd portion of the cache; the remaining portion will then be represented by another similar structure, not shown, whose output is also input to the one bit flip flop 130 to provide a single cache miss signal.

Data Store 124 is a random access memory (RAM) which stores the cache entries, while Tag Store 120 stores the associated 9-bit tags, and Invalid Bit Store 122 stores the associated Invalid Bits. Elements 124, 122 and 120 are all addressed by the 12-bit index from cache address latch 114 (FIG. 13), input by the "address clock" timing signal (L1 LA ) (FIG. 13). The tag portion of the cache entry is read out to tag latch 134. The word portion of the cache entry is simultaneously read out to data latch 126.

Tag latch 134 is controlled by the "tag latch enable" signal (timing signals L0+L2, the trailing edge of the pulse being active) to transmit the stored tag to tag comparator 132. The address tag portion selected at multiplexer 104, represented as CWA 0-8, is input to tag comparator 132 from latch 116 (FIG. 13) by the "in tag clock" (L1 LA inverse) for comparison. The miss/hit output of the comparator is low if the tags are equal, or high if they are unequal. This output is input to a one-bit flip flop 130 which is sampled by the "Miss clock" (LA inverse) for a central processor read memory operation only, as controlled by the "Read" Signal from FIG. 15. On a central processor write memory operation or on a BA address subcycle, no cache miss or cache miss inverse signal is generated. The miss/hit bit from comparator 132 is OR'd with the stored Invalid bit from store 122, before being input to flip flop 130. Thus, for a central processor read, either a no-tag-match condition or an invalid bit results in a cache miss, represented by the cache miss signal (condition signal).

The miss/hit signal is input to flip flop 137 of FIG. 15, as previously described, which generates a "Miss Extended" inverse signal (during a read operation only).

The data from data store 124 is latched out of data latch 126 by the "data latch enable" signal (L1 L2) to buffer 128. If the tags are equal, and the bit from store 122 indicates the entry is valid, then the data from buffer 128 goes directly on bus 40 to the memory data register 56 of central processor 12 (FIG. 3); the Miss Extended inverse signal from flip flop 137 enables latch 54 (FIG. 2) and disables buffer 128.

The miss/hit bit from tag comparator 132 is also input to set flip flop 146. During a subsequent cache cycle, as will be described in more detail in connection with FIG. 22, the Invalid output is applied to the data-in port of the cache Invalid store 122, to be written at the address currently applied to the store from cache address latch 108.

Since the data latch enable signal is high only during the first cache operating cycle subcycle, no data will be latched out to central processor 12 during the second subcycle, for a cache check, invalidate write, or cache data write operation.

Referring again to FIG. 11, as has been described, the cache miss signal stops the central processor by inverting GT2, which inhibits timing pulses T1 and T2. The central processor is therefore stopped after timing pulse T0. If no bus adapter is requesting main memory access, the priority circuit of FIG. 16 generates the signal CP/(BA Inverse). The cache miss can be immediately satisfied.

To satisfy the central processor read request on a cache miss, the module select bits (not shown) and the address signals BMAR 3-20 (from FIG. 13) are sent to main memory 16 (Fig. 19), together with timing and control signals from FIG. 15, to select the addressed double word. Three instruction cycles are required to complete the main memory access. The double word is routed through memory controller 18 on bus 44, and is then sent on bus 52 to CP data latch 54 (FIG. 2); the Miss Extended signal latches the data into memory data register 56 (FIG. 13).

The cache miss signal is cleared (FIG. 14) at L0 when the memory timing circuitry of FIG. 15 has determined that the last cycle of the three required main memory operation cycles has been reached, for a memory read operation pertaining to the central processor (LC, LCM 24, and LCP; LCM 24 is the latched memory control signal CM 24 from FIG. 18, which is always high for a read operation). These inputs together are called the "Clear Miss" signal, which is also input to the circuitry of FIG. 15, where it clears the Read signal.

In response to the cleared cache miss signal (miss inverse goes high), the "STCP" (stop central processor) signal inverts at L0 (flip flop 135, FIG. 15). Referring again to FIG. 11, when Miss inverse goes high, GT2 allows pulses T1, T2 to be output to the central processor, which restarts the processor in mid cycle. GT1 then allows pulses TA, T0 to be output. The central processor then continues to operate until another cache miss occurs (or unless a write main memory operation occurs, which is not pertinent to the present invention).

More in detail, and referring now to the timing chart of FIG. 23, the signal STCP inverse is normally high. It becomes low in either the case of a central processor write to main memory, not described herein, or in response to the Miss signal from flip flop 130 (FIG. 14), as shown in FIG. 15. STCP inverse goes low at the time L1. As seen in FIG. 11, STCP inverse is the input to the Clear of GT1 flip flop 61; when STCP inverse goes low, GT1 inverse is forced low, inhibiting the next TA, T0 pulses to central processor 12, and GT1 is forced high.

In the absence of the cache miss signal (that is, in the case of a central processor main memory write operation), the GT1 signal is input to D of the GT2 flip flop 63; thereafter, at the next L0 pulse, GT2 inverse goes low, inhibiting the next T1, T2 pulses to central processor 12. When STCP inverse goes high again (after the write operation is initiated) at pulse L1, GT1 inverse goes high at pulse L2 (timing pulses TA, T0 are allowed), and GT2 inverse goes high at the next pulse L0 (timing pulses T1, T2 are allowed). Thus in the Write Main Memory case, the central processor 12 is stopped at TA and takes up again at that pulse.

In the case of stopping the central processor because of a cache miss, the cache miss signal is not generated until L0, halfway through the TA pulse. Therefore a different stopping time (and timing of resuming operations) must be provided in this case. For this purpose, the cache miss inverse signal is AND'd with GT1 for input to D of GT2 flip flop 63, and the cache miss inverse signal is also AND'd with the GT2 inverse output of flip flop 63. Therefore the gating signal GT2 is forced high when cache miss inverse inverse goes low, inhibiting the T1, T2 pulses and stopping the central processor in mid-instruction cycle. GT1 inverse is subsequently forced low (at L1) by STCP.

After the cache update has been completed, with the cache data store being written (as will be described) during time TA of the second cache subcycle within the last main memory cycle), the cache miss signal from flip flop 130 is cleared (FIG. 14). Cache miss inverse goes high at L0; STCP inverse goes high at L1 (FIG. 15). The transition of cache miss inverse forces GT2 low at L0, which allows timing pulses T1, T2 to be output to central processor 12; thereafter, at L2, GT1 inverse goes high and allows pulses TA, T0. The central processor instruction cycle therefore resumes in midcycle, where it left off.

The cache data store is updated after a cache miss, or during a central processor main memory write operation, by a write cache operation.

Figure 20:
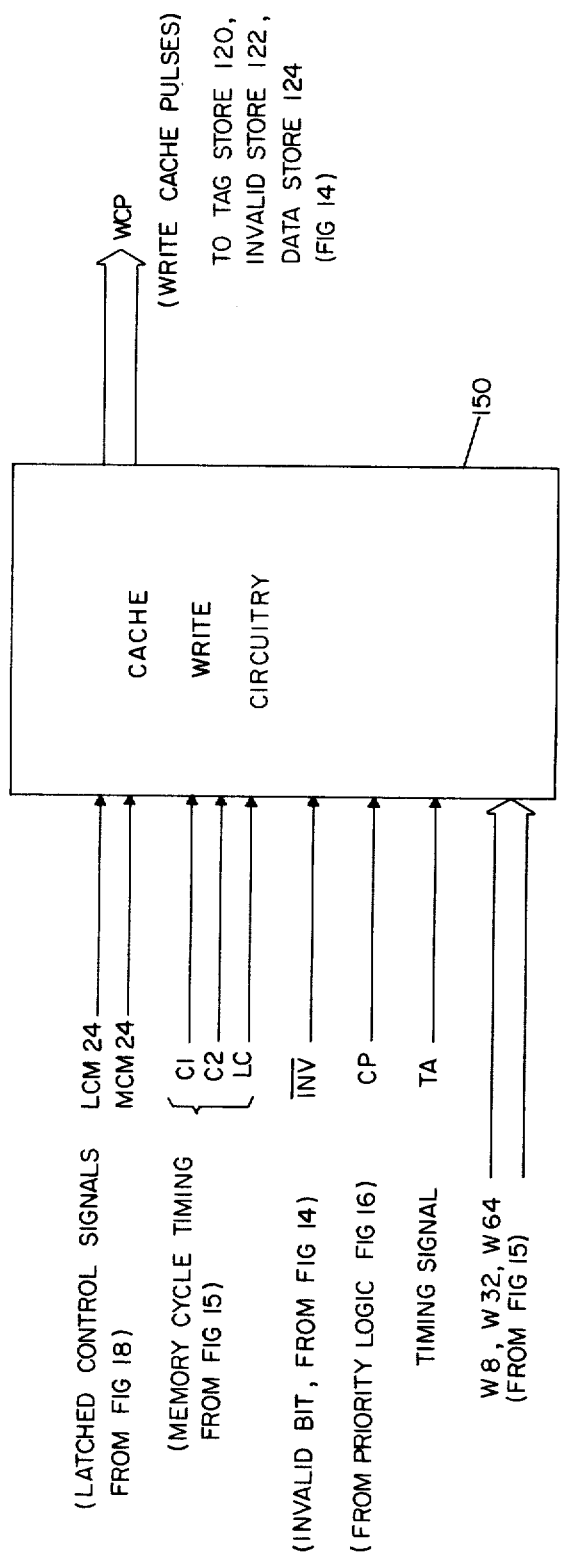
FIG. 20 shows the cache write logic.

Referring now to FIG. 20, the cache write circuitry 150 controls the writing of the cache contents after a cache miss, and also controls the writing of the cache Invalid bit after a tag Match on a BA address comparison. For writing the Invalid bit, the Invalid (inverse) bit (from flip flop 146, FIG. 14) is input to circuitry 150. For writing the cache data store, the control signals LCM 24 and MCM 24, and the write control signals Write 8, Write 16, Write 32 or Write 64 (from FIG. 15) are input.

Writing the cache data store occurs at different times for a main memory write or read operation, as will appear in connection with FIG. 23. All writes occur at time TA, that is, during subcycle B of the cache operating cycle. For a main memory write operation, the write pulses are output at time TA of memory cycles C1 and C2 (FIG. 15), while for a main memory read (cache update) the write pulse is output at time TA of memory cycle 3 (LC, last cycle). Invalidate bit writes also occur at time TA, during any cycle of the main memory cycle. Since all writes occur during the second subcycle of the cache operating cycle, the cache write operations cannot interfere with the accepting of a central processor read memory request during the first cache subcycle.

The Write Cache Pulses are input to tag store 120, invalid store 122, and data store 124 (FIG. 14) as appropriate.

The dedication of the cache subcycles to particular functions, as described, and in particular the dedication of the first subcycle exclusively to accepting a central processor memory read request, has the result that a central processor address for a memory read operation is always accepted, once in each cache cycle, for the purpose of comparing its tag with the cache contents. If there is a cache hit, the requested data is returned to the central processor within the TA period of the next central processor microinstruction cycle. The central processor is thus able to proceed without pause.

If there is a cache miss, the central processor is stopped, and may be obliged to wait several cycles until it obtains main memory access, which occurs only when no bus adapter is contending for access. When the data is obtained from main memory, it is provided immediately to the central processor, during the second subcycle of the cache cycle, and when the central processor is started again in response to the cache miss inverse going high, the central processor starts in a phase of operation as though there had been a cache hit. The cache data store is written during the second cache subcycle, after the central processor has restarted.

The cache is checked for bus adapter tag matches only during a second subcycle of the cache operating cycle. On a tag match condition, flip flop 146 is set, and on the next second subcycle (after the central processor has had its opportunity to enter a read memory request) the invalid bit at the matched address is written by cache write logic 150 (FIG. 20). Any subsequent attempt by the central processor to read that location in cache will result in the generation of a cache miss signal, and the cache will be updated as has been described.

As a result of this dedication of cache operating subcycles, the writing of the cache (either to write an invalid bit, to update a doubleword in response to a cache miss, or to update the cache after a central processor main memory write) is "transparent" to the read memory operations of the central processor. The central processor never has to wait while such writing is done. In particular, unlike the arrangement in many data processing machine employing a cache memory, there is no "dedicated" cache cycle required for updating the cache after a cache miss before the central processor can resume operation. Moreover, the central processor can immediately (on its next microinstruction cycle) read a location which has just been updated after a cache miss. When the central processor attempts to read a location which has just been the location of a main memory write operation, anomalies may occur, but this situation is easily avoided by suitable precautions in microprogramming the central processor.

Referring now to the timing diagrams of FIGS. 21, 22 and 23, the operation of the invention will be described.

Figure 21:
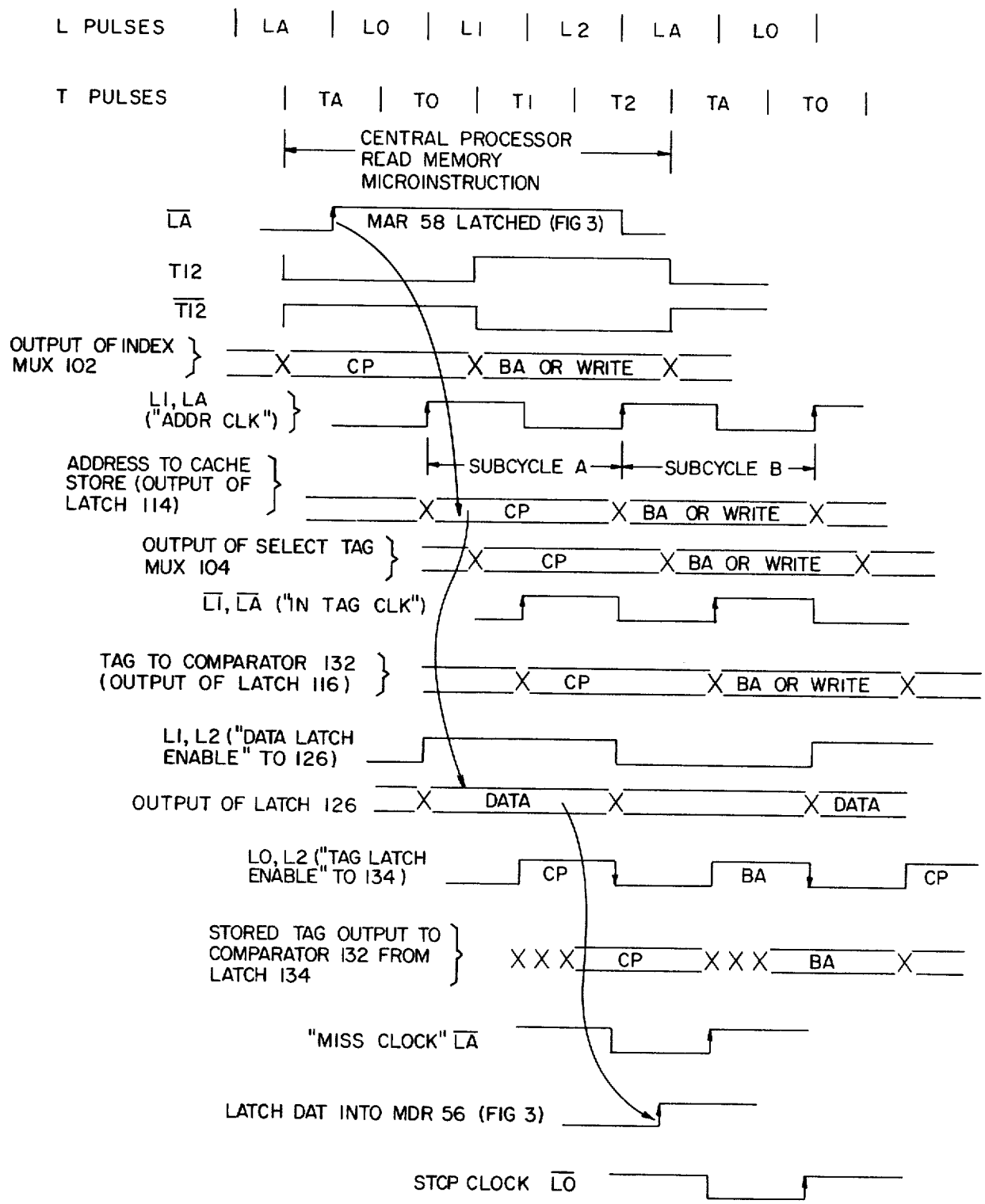

Referring first to FIG. 21, the events of a central processor read memory operation are shown.

The central processor read memory microinstruction begins at time TA and lasts through T2. At the positive edge of LA inverse, the address is made available to cache 24 from memory address register 58 (FIG. 3). While T12 is low, the A inputs to index multiplexer 102 (FIG. 13) are selected, transmitting the central processor index to cache address latch 114. The "address clock" (L1, LA) goes high at L1 and transmits the central processor index from latch 114 to address the cache store (FIG. 14). In response, data is output from data store 124 and is latched out of data latch 126 at during L1 L2 (80 nanoseconds). This data is latched into the central processor memory data register 56 (FIG. 3) at TA. In the case of a cache hit, the central processor continues without pause with its next microinstruction cycle.

When T12 goes high, T12 inverse goes low, and the A inputs (central processor tag) to select tag multiplexer 104 are selected and transmitted to select tag latch 116. The "in tag clock" (L1 inverse, LA inverse) latches the tag out to comparator 132 (FIG. 14). The stored tag is output from tag store 120 at the same time as the stored data, in response to the input index from latch 114; the negative-going edge of the "tag latch enable" (L0, L2) transmits the stored tag to comparator 132. The miss-hit output of comparator 132 is input to flip flop 130, which is samples at LA inverse ("miss clock"). In the case of a cache miss, the cache miss signal input to flip flop 135 (FIG. 15) causes STCP to invert at L0 inverse.

As is seen in FIG. 21, the cache miss signal is generated only after the cache data has already been transferred to the memory data register of central processor 12. If there is no miss, the central processor continues with that data. If there is a miss, the central processor will be stopped after T0 (as will be described in connection with FIG. 23); the data will be replaced by the main memory read operation before the central processor resumes operation.

Figure 22:
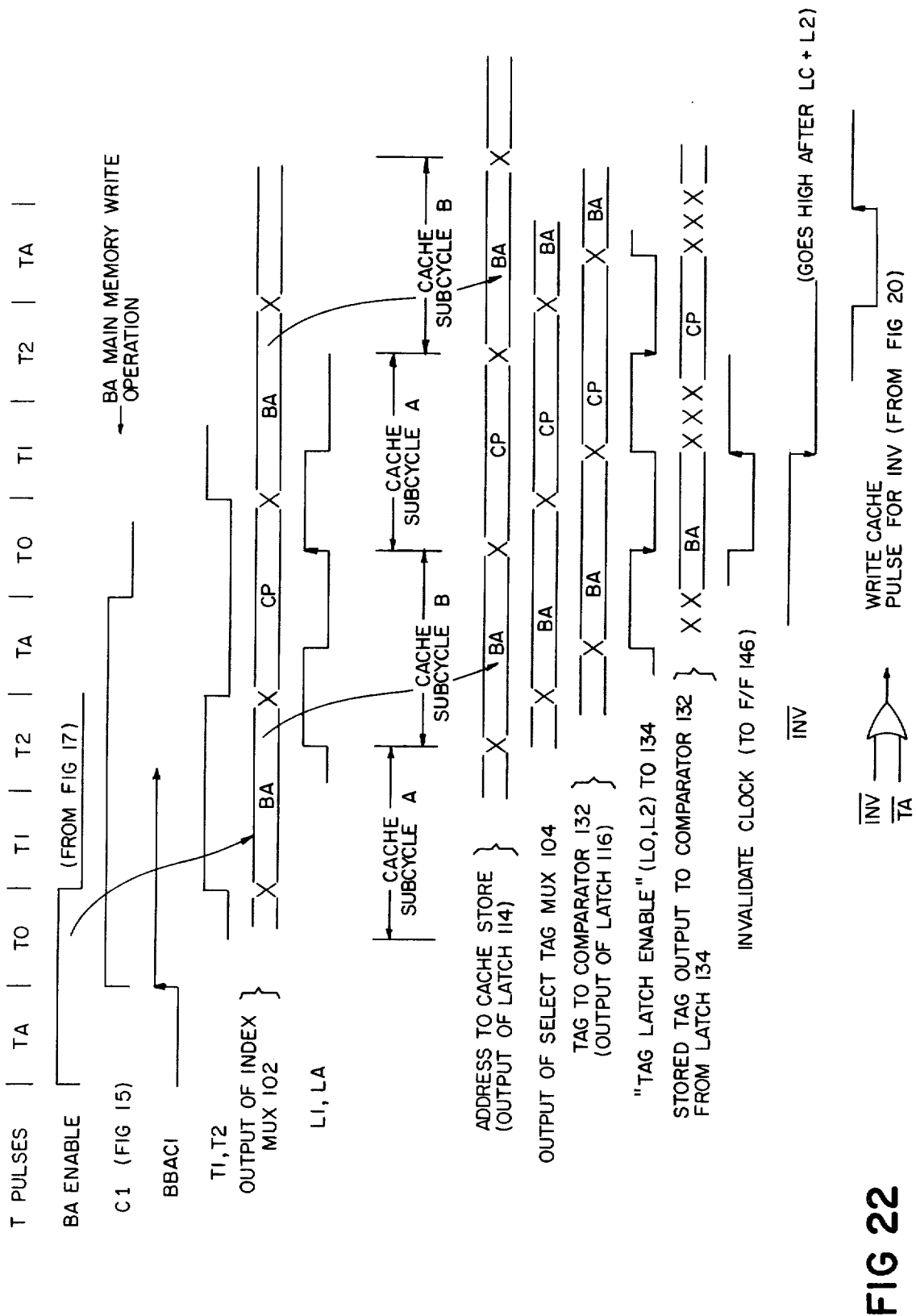

Referring now to FIG. 22, the cache check and invalidate operations are illustrated. These operations are initiated only on a bus adapter (peripheral processor) write to main memory operation. For such an operation, the bus adapter sends the MRBA signal to the circuitry of FIGS. 16 and 17, which generate the BA priority signal and the BA enable signal. The BA enable signal goes high at TA. A main memory operation is initiated by the circuitry of FIG. 15, beginning with cycle 1 (C1) at T0. The memory access control signal BAC1 is latched as BBAC1 when the memory operation begins. When T1, T2 is high, the B inputs (BA index) to multiplexer 102 are selected and output to cache address latch 114. The "address clock" (L1, LA) outputs the BA index to the cache store (FIG. 14). No data is transmitted to the central processor.

The B inputs (BA tag) to multiplexer 104 are selected when T1,T2 inverse goes high; the BA tag is transmitted to select tag latch 116. The "in tag clock" (L1 inverse, LA inverse) latches the tag out to comparator 132. The stored tag is latched out of tag latch 134 by "tag latch enable" (L0, L2) to comparator 134. The miss/hit bit is input to the invalidate flip flop 146 (FIG. 14), which is sampled by the "invalidate clock" at L2. In the case of a tag match condition, the output INV inverse (normally high) goes low.

The INV inverse signal is input to the cache write circuitry of FIG. 20, where it causes a write cache pulse to be output at TA. The INV output of flip flop 146 is the data input to invalid bit store 122 (FIG. 14) when the write cache pulse is input. The address at which the INV signal is written is the same address at which the tag match condition was found, since the address is maintained in buffer 106 throughout the BA main memory write operation (no further BA address can be input until the memory operation is completed, which may be after several cache operating cycles). The invalidate write operation may in fact be repeated during each cache cycle throughout the main memory operation; this causes no problem. Note that during the entire BA main memory operation, including the invalidate write operations, the central processor continues to have an opportunity in each cache cycle to read the cache. If one of the central processor read operations results in a cache miss, the central processor must be stopped until after the completion of the BA main memory operation; if no other BA memory operation is pending, the central processor will then be given memory priority by the circuitry of FIG. 16, and the main memory read and cache update can proceed.

Referring now to FIG. 23, the events of a cache miss and update are shown. The cache miss inverse signal goes low at L0 (FIG. 14); the STCP inverse signal goes low at L1 (FIG. 15). The central processor 12 is stopped after T0. The main memory operation is initiated with cycle 1 (C1) at T0. The main memory operation comprises three cycles; the memory is written during cycles 1 and 2 and read during cycle 3. The cache write pulse for updating the cache store after a miss is generated during the last cycle (C3) since the main memory must be read before the cache store can be written. Cache miss inverse goes high again at L0 during the last main memory cycle; STCP inverse goes high at L1. The central processor is restarted at pulse T1.

For a central processor memory write, the cache write pulses are output at TA during cycles 1 and 2; the central processor is restarted after the memory operation has begun. Central processor 12 can therefore read the cache during each subcycle A while the write cache operation continues during subcycle B.

What is claimed is:

1. In a data processing machine including main memory means for storing data, including instructions for directing operations of the machine, and processor means for processing data, cache memory means, comprising:

cache means, including
   means for storing a copy of a portion of the data stored in the main memory means,
   cache control means for receiving read and write requests from the processor means and for providing addresses corresponding to certain requests to a memory controller means,
   cache tansfer means responsive to operation of the cache control means for conducting data from the memory controller means to the cache storing means and for conducting data from the cache storing means to the processor means, and
the memory contoller means, including
   controller control means responsive to the addresses for providing outputs for controlling operation of the controller means and the cache and main memory means, and
   controller transfer means for conducting read data from the main memory means to the cache storing means and for conducting write data directly from the processor means to the main memory means,
      the controller control means including timing means defining a cache memory means operating cycle comprising a first subcycle and a second subcycle, and
      the cache and controller control means responsive to the timing means for accepting only processor read requests during first subcycles and for accepting and resolving conflicts between all other cache and memory operation requests during second subcycles.

2. The cache memory means of claim 1 wherein the cache control means is responsive to a processor data write request received during a first subcycle for providing a corresponding write address to the controller means for initiating a processor data write operation directly from the processor means to the main memory means through the controller means during a subsequent second subcycle.

3. The cache memory means of claim 1 wherein the cache control means is responsive to a processor read request received during a first subcycle for data not included in the copy residing in the cache storing means for providing a corresponding read address to the controller means to initiate a corresponding read opeation from the main memory means and through the controller means to the cache storing means during a subsequent second subcycle.

4. The cache memory means of claim 3 wherein the memory controller transfer means further comprises:
   means responsive to operation of the controller control means also for directly conducting to the processor means the data provided from the main memory means to the cache storing means in the corresponding read operation.

5. The cache memory means of claim 1 wherein the data processing machine further includes one or more peripheral processor means and the cache memory means further comprises:
  in the cache control means,
    means responsive to peripheral processor read and write addresses for providing peripheral processor addresses to the controller means, and
  in the controller transfer means,
    means for conducting data between the peripheral processor means and the main memory means, and
  the controller control means is further responsive to peripheral processor addresses for correspondingly conducting data between the peripheral processor means and the main memory means.

6. The cache memory means of claim 5, wherein the cache control means is responsive to peripheral addresses referring to data included in the copy residing in the cache storing means for providing an output to the controller control means to initiate a read of a new copy of the data referred to from the main memory means to the cache storing means.

* * * * *